(12) United States Patent
Clevenger et al.

(10) Patent No.: US 8,024,012 B2
(45) Date of Patent: Sep. 20, 2011

(54) INTELLIGENT WIRELESS POWER CHARGING SYSTEM

(75) Inventors: Lawrence Clevenger, LaGrangeville, NY (US); Timothy Dalton, Ridgefield, CT (US); Louis Hsu, Fishkill, NY (US); Carl Radens, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 12/137,185

(22) Filed: Jun. 11, 2008

(65) Prior Publication Data

US 2009/0312046 A1    Dec. 17, 2009

(51) Int. Cl.
*H04B 1/38* (2006.01)
*H04B 1/16* (2006.01)

(52) U.S. Cl. ............... 455/572; 455/573; 455/343.1; 455/343.2; 455/343.6

(58) Field of Classification Search ............... 455/572, 455/571, 290, 343.1, 573, 343.2, 343.6
See application file for complete search history.

(56) References Cited

U.S. PATENT DOCUMENTS

| | | | |
|---|---|---|---|
| 4,815,106 A | 3/1989 | Propp et al. | |
| 6,016,046 A | 1/2000 | Kaite et al. | |
| 6,021,332 A | 2/2000 | Alberth, Jr. et al. | |
| 6,100,663 A | 8/2000 | Boys et al. | |
| 6,118,249 A | 9/2000 | Brockmann et al. | |
| 6,212,403 B1 | 4/2001 | Ushiroda | |
| 6,236,326 B1 | 5/2001 | Murphy | |
| 6,243,413 B1 | 6/2001 | Beukema | |
| 6,664,770 B1 | 12/2003 | Bartels | |
| 6,892,147 B2 | 5/2005 | Bui et al. | |
| 7,023,341 B2 | 4/2006 | Stilp | |
| 7,068,991 B2 | 6/2006 | Parise | |
| 7,126,310 B1 | 10/2006 | Barron | |
| 7,236,809 B2 * | 6/2007 | Fischedick et al. | 455/573 |
| 7,310,697 B2 * | 12/2007 | Pandit et al. | 710/313 |
| 7,627,288 B2 * | 12/2009 | Iida | 455/41.1 |
| 2003/0199778 A1 | 10/2003 | Mickle et al. | |
| 2004/0185917 A1 * | 9/2004 | Fischedick et al. | 455/574 |
| 2005/0017673 A1 | 1/2005 | Tsukamoto et al. | |
| 2005/0127867 A1 | 6/2005 | Calhoon et al. | |
| 2005/0127868 A1 | 6/2005 | Calhoon et al. | |
| 2006/0238365 A1 | 10/2006 | Vecchione et al. | |

(Continued)

OTHER PUBLICATIONS

Hirai et al., "Study on Intelligent Battery Charging Using Inductive Transmission of Power and Information", IEEE Transactions on Power Electronics, vol. 15, No. 2, Mar. 2000, pp. 335-345.

*Primary Examiner* — Tilahun B Gesesse
(74) *Attorney, Agent, or Firm* — Scully, Scott, Murphy & Presser, P.C.; Louis J. Percello, Esq.

(57) ABSTRACT

A system and methodology for intelligent power management of wirelessly networked devices. The system provides for reliable wireless communication via a wireless power charging method and, a method to maintain power capacity of batteries in a wireless device. The batteries are charged via an RF harvesting unit embedded inside the wireless device. An intelligent wireless power charging system further comprises at least two batteries and at least two RF adaptor devices coupled to an AC power line. The first adaptor is set for data communication while the second adaptor is used to transmit the power. In addition, when a first battery is in use during active mode, the second battery is subjected to wireless charging.

25 Claims, 5 Drawing Sheets

U.S. PATENT DOCUMENTS

| | | |
|---|---|---|
| 2006/0244573 A1 | 11/2006 | Wendler |
| 2006/0251958 A1 | 11/2006 | Ayala et al. |
| 2006/0279250 A1 | 12/2006 | Keely et al. |
| 2006/0284593 A1 | 12/2006 | Nagy et al. |
| 2007/0003053 A1 | 1/2007 | Mathoorasing et al. |
| 2007/0010295 A1 | 1/2007 | Greene et al. |
| 2007/0024238 A1 | 2/2007 | Nakade et al. |
| 2007/0109121 A1 | 5/2007 | Cohen |
| 2007/0178945 A1* | 8/2007 | Cook et al. ............ 455/572 |
| 2007/0191074 A1* | 8/2007 | Harrist et al. .......... 455/572 |
| 2007/0254726 A1* | 11/2007 | Iida ....................... 455/572 |

\* cited by examiner

INTELLIGENT WIRELESS POWER CHARGING SYSTEM

FIELD OF THE INVENTION

The present invention generally relates to a wireless power charging system and, more particularly, to system and method for providing wireless intelligent charging for wireless networked devices.

BACKGROUND OF THE INVENTION

Networking of small offices and homes are increasing in popularity. For example, in a home office, it is strongly desired to have the ability to inexpensively and reliably interconnect multiple network devices without having to install Ethernet or twisted pair backbone wiring. These network devices, for example, include personal computer, lap-top computers, printer, digital TV, set-top box, home appliances, etc. To achieve this, both wireless solutions and Internet on-power line solutions (e.g., according to the HomePlug® industry solution) have been considered as the physical layer backbone for such networking.

As known, the HomePlug® makes use of the existing in-home AC power wires for transmitting signal data at high speed. Conventional power line networks generally operate with data rates ranging from about 10 kbps to 350 kbps.

U.S. Pat. No. 4,815,106 issued to Propp, et al. entitled, "Power line Communication Apparatus", discloses a power line communication method via equalizer/coding scheme. A 350 kbps power line network system based on frequency modulation (FM) methods such as binary frequency shift keying (BFSK) can be achieved. In U.S. Pat. No. 6,243,413 issued to Beukema, et al., describes a modulation system used for a 1 Mbps power line communication channel.

Currently, all the wireless HomePlug® systems require a wireless device with an antenna and a wireless HomePlug® adaptor to facilitate wireless data communication between wireless devices and the network. However, wireless devices need power supply to keep them operational. Wireless devices, especially those portable ones, are mostly powered by using batteries. The batteries are periodically charged using a charging device typically plugged into a wall AC power outlet to obtain power there from.

In order to reduce wire congestion, wireless methods implementing a wireless device for charging batteries have been realized. These wireless charging methods include radio frequency interface, optical interface or, a magnetic interface to couple the battery pack to a wireless charging source. Several example of wireless charging battery systems include:

Currently, most RFID systems are passive and typically include a transmitter or transceiver device that is used to provide operational power (electromagnetic field, electric field, or magnetic field) to a receiver (tag) within a specified range. The tag in response to application of the transmitted operational power generates a signal that is received by a RFID system receiver (transceiver). The generated tag signal includes one or more unique identifiers for uniquely identifying the tag and object(s) associated therewith. In a passive RFID tag, no power storage and thus, no battery is needed. The passive power such as generated by an RFID transmit device however, can not be used to power existing wireless devices such as cell phone, portable computer, etc.

One way to charge a battery in a wireless manner is shown in US Patent application publication, 20060238365 by Vecchione; Elio; et al, titled "Short-range wireless power transmission and reception". It describes a method of short-range wireless power transmission and reception system. Power is transmitted from the electrical utility mains power supply to electrically powered appliances via electromagnetic radiation. The appliances are capable of receiving the transmitted power, converting it into electricity and storing it for subsequent use, as well as using it directly to power the appliances. This method is now implemented to charge battery of electric tooth brushes, however, it does not solve the wire congestion problem, since wire is still needed for the reception system.

US Patent application publication, 20070010295 by Greene; Charles E. et al, titled "Power transmission system, apparatus and method with communication", teaches a power transmission system with communication having a base station having a wireless power transmitter, a wireless data transmission component, and a first wireless data reception component. The system includes a remote station having a power harvester for converting the power from the power transmitter into direct current and a power storage component in communication with the power harvester for storing the direct current. Alternatively, the system includes a base station having a wireless power transmitter which transmits power at a frequency at which any sidebands are at or below a desired level, and a first wireless data communication component. The base station is used to transmit operational power and data to the remote station. Unlike RFID system, the proposed remote station is an active system meaning it contains power storage and has the ability to operate when the base station is not supplying the operational power. However, due to the lack of intelligent power charging system, a battery could be over charged or do not have enough capacity when the device is in usage. Additional issues are that no warning system is provided when device is placed out of charging range and there is no mechanism to guarantee a reliable and continuous operation, since battery charging will interrupt data communication operation.

US Patent application publication, 20060244573A1 by Wendler, Steve; titled, "Integration of antenna and solar charger for remote asset tracking", proposes an apparatus comprises a solar array configured to provide power to an asset tracking device and antennas configured to provide signals to the asset tracking device. The solar array comprises a bank of solar cells that are connected to the asset tracking device. The solar cells are configured to provide power to enable operation of the asset tracking device when external power is not available to the asset tracking device. Power from the solar array may be used to directly power the asset tracking device and/or charge a battery used by the asset tracking device. The antennas may include a Global Navigation Satellite System (GNSS) antenna as well as antennas that are used by a wireless transceiver to receive and transmit information to and from the asset tracking device, respectively.

These devices must be placed under the sun where solar energy is the only power source. It may be used in a green house, but the battery will be depleted at night or during cloudy day. It is not a reliable means to maintain power for devices such as cell phone or portable computers.

US Patent application publication, 20060251958A1 by Ayala, Adan; titled "Battery charge indicator", proposed a battery charge indicator for portable power tools, has indicator assembly to indicate state-of-charge of battery pack according to position of movable component moved by protrusion of cordless device and charger respectively. The battery charging level of a cordless tool is shown. When it is fully charged, the system can start charging the other battery. This tool is charged using a wired interface. There is no need of battery charging intelligence for such applications.

For a wireless power charging system, it is desirable to ensure that the batteries are maintained in full capacity so that there is no power outage during the utilization period of the wireless devices. It is further desirable that battery is not overcharged, that is when a full charge capacity is reached charging mechanism can be terminated. For HomePlug® applications, it is also necessary that wireless devices are located within a charging distance so that batteries of the devices can be effectively charged. Another critical aspect for such application is during utilization of the wireless devices, battery charging should not interrupt the data communication operation. There is a need of an intelligent charging system for HomePlug® system wherein batteries are automatically charged in a wireless mode to ensure uninterrupted wireless data communication.

SUMMARY OF THE INVENTION

The present invention provides an Intelligent Battery Charging System (hereon called IBCS) for wireless devices so that the primary battery is always maintained at a proper charge level. The charging is performed via wireless communications.

In one aspect, the invention includes a back-up battery, therefore when the primary battery is in use, the back-up battery can be charged to avoid interruption of and maintain normal operation.

Further, the invention provides the ability to achieve and maintain a predetermined battery charging level within an upper and a lower limit. When battery level reaches its lower limit, the IBCS initiates instructions for initiating charging; and when battery level reaches to its upper limit, the IBCS stops the charging.

In a further aspect, the invention includes a battery swapping mechanism operable such that when the primary battery reaches a pre-set lower limit, causes automatic and seamless swapping to a back-up battery, and allow the primary battery to continue charging.

One more object of the invention is to have a built-in warning device embedded for operation within the IBCS that triggers warning signals when wireless devices are placed outside their battery charging range.

Thus, in accordance with a first embodiment of the invention, there is provided an intelligent power management system and method for wirelessly networked devices including one or more chargeable energy storage devices for powering the networked device. The system comprises:

an adaptor device, adapted for coupling to an AC power receptacle providing AC power signals, the adaptor device further comprising a power charge unit receiving the AC power signals and generating and transmitting RF power signals for charging the chargeable energy storage devices of the wirelessly networked device;

the adaptor further having a transmitter device for transmitting wireless data communication signals to the wirelessly networked device, and a receiver device for receiving wireless data communication signals from the wirelessly networked device; and, a switchable antenna device switched to receive wireless data communication signals from or transmit wireless data communication signals to the wirelessly networked device in a first operation mode, and switched to transmit the RF power signals for powering a wirelessly networked device in a second operation mode.

Further to this embodiment, the wirelessly networked device comprises:

a power harvesting unit including an RF energy converter for receiving the transmitted RF power signals and converting the RF power signals into a charge current suitable for charging the wirelessly networked device;

a switch device coupled to the one or more chargeable energy storage devices for switching in or out the charging current according to device power level status; and, a control unit for monitoring a device power level status indicating a state of charge of the one or more energy storage devices, the control unit operatively coupled to the switch device for enabling switching in a charge current for charging the energy storage device when a device power level status is determined below an acceptable limit, wherein, the system provides wireless device power charging to maintain an energy storage device at a proper charge level.

Furthermore, the power charge unit of the adaptor device comprises:

a signal converter means for generating a dc signal commensurate with the received AC power signals;

a frequency generator device receiving the generated dc signal and selecting a RF power signal frequency according to the generated dc signal; and, RF power amplifier for generating the transmitted RF power signals for powering a wirelessly networked device at the selected RF power signal frequency.

Thus, in this embodiment, a single adaptor using only one antenna for power, transmitter (TX) and receiver (RX) for those devices with low data communication; however, data can be put on hold while the battery at the wireless device is charging. This embodiment can be used for wirelessly networked device to download any kind of files including text, photos, video, etc. . . . , however, a single, low-cost antenna can be used to share the three functions.

In accordance with a second embodiment, there is provided an intelligent power management system and method for wirelessly networked devices including one or more chargeable energy storage devices for powering said networked device. The system comprises:

a first adaptor device, for coupling to an AC power receptacle, having a transmitter device for transmitting wireless data communication signals to a wirelessly networked device, and a receiver device for receiving wireless data communication signals from the wirelessly networked device, the first adaptor device providing an interface for communicating data signals to a network via AC power lines;

a second adaptor device, for coupling to an to an AC power receptacle providing AC power signals, and adapted for wireless data communication with the wirelessly networked device, the second adaptor device further comprising a power charge unit receiving the AC power signals and generating and transmitting RF power signals for powering a wirelessly networked device;

the first adaptor device including a single antenna device adapted to receive wireless data communication signals from or send wireless signals to the wirelessly networked device, and, the second adaptor device including a single antenna device adapted to transmit the RF power signals for powering the wirelessly networked device, the wirelessly networked device receiving simultaneously both the wireless data communication signals from the first adaptor device and RF power signals from the second adaptor device;

a power harvesting unit, provided at the wirelessly networked device, including RF energy converter unit for receiving the transmitted RF power signals and converting the RF power signals into a charge current suitable for charging the wirelessly networked device;

a switch device, at the wirelessly networked device, coupled to the one or more chargeable energy storage devices for switching in or out the charging current according to device power level status; and, a control unit for monitoring a device power level status indicating a state of charge of the one or more energy storage devices, the control unit operatively coupled to the switch device for enabling switching in a charge current for charging the energy storage device when a device power level status is determined below an acceptable range, wherein, the system provides wireless device power charging to maintain an energy storage device at a proper charge level.

Thus, in this embodiment, two adaptor plugs—a slave for power charging, and a master for data communication is provided, for enabling simultaneous, data communications operations and battery charging operations for said wirelessly networked device.

In accordance with a third embodiment, there is provided an intelligent power management system and method for wirelessly networked devices including one or more chargeable energy storage devices for powering said networked device. The system comprises:

a first adaptor device, for coupling to an AC power receptacle, having a transmitter device for transmitting wireless data communication signals to a wirelessly networked device, and a receiver device for receiving wireless data communication signals from the wirelessly networked device, the first adaptor device providing an interface for communicating data signals to a network via AC power lines;

a second adaptor device, for coupling to an to an AC power receptacle providing AC power signals, and adapted for wireless data communication with the wirelessly networked device, the second adaptor device further comprising a power charge unit receiving the AC power signals and generating and transmitting RE power signals for powering a wirelessly networked device;

the first adaptor device including a single antenna device adapted to receive wireless data communication signals from or send wireless signals to the wirelessly networked device, and, the second adaptor device including a single antenna device adapted to transmit the RF power signals for powering the wirelessly networked device, the wirelessly networked device receiving simultaneously both the wireless data communication signals from the first adaptor device and RF power signals from the second adaptor device;

a power harvesting unit, provided at the wirelessly networked device, including RF energy converter unit for receiving the transmitted RF power signals and converting the RF power signals into a charge current suitable for charging the wirelessly networked device;

a switch device, at the wirelessly networked device, coupled to the one or more chargeable energy storage devices for switching in or out the charging current according to device power level status; and, a control unit for monitoring a device power level status indicating a state of charge of the one or more energy storage devices, the control unit operatively coupled to the switch device for enabling switching in a charge current for charging the energy storage device when a device power level status is determined below an acceptable range, the one or more energy storage devices includes a primary battery for powering the wirelessly networked device, and, further includes a back-up battery, the switching device controllable for switching out powering of wirelessly networking device from the primary battery and initiate charging operations for the primary battery when the primary battery is determined to have a device power level status below an acceptable range, and, seamless switching in the back-up battery for powering wirelessly networked device operations, wherein, the system provides wireless device power charging to maintain an energy storage device at a proper charge level.

Thus, in the third embodiment, two chargeable energy storage devices (batteries) is provided in the wireless device—one battery being adapted as a backup. Therefore, in this embodiment, data transmission and receiving will not be interrupted by the power charging operations. In other words, batteries can be dynamically swapped, and with the aid of a capacitor device, to hold the charge during swapping. Thus, the wireless device will be maintained fully powered.

Further to these embodiments, a range checking and warning system is provided such that, if the wireless networked device is not placed close enough to an adaptor, the device will warn the user that power can not be charged and that the device should be placed closer to the slave adaptor.

Further to the above-identified embodiments of the present invention, the wireless charge signals generated by the IBCS system can be tailored to the particular device. That is, the wireless charging may be performed in a controlled manner, such as operably programmed by instructions executed by a processor device provided at the plug, for example.

For example, the wireless charge signals can be tailored to storage device characteristics, e.g., performing a charging hysteresis as needed by certain types of batteries or storage devices, and/or control the charge/discharge cycle depth.

Further to the above-identified embodiments of the present invention, the types of power storage devices contemplated for wireless charging in accordance with the present invention include, but is not limited to: chargeable/re-chargeable batteries, fuel cell, capacitors, charge storage, electrolytic, chemical energy storage, flow cell, voltaic, radioactive, or other energy storage devices.

BRIEF DESCRIPTION OF THE DRAWINGS

The features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
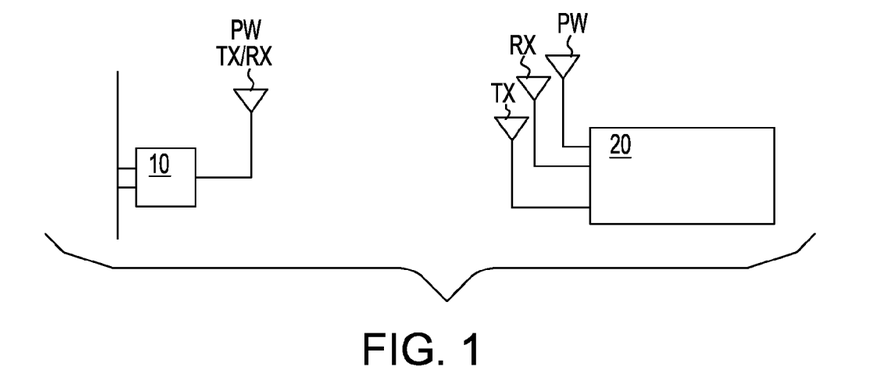
FIG. 1 depicts generally a IBCS wireless communication and battery charging system accordance to the present invention.

Referring to FIG. 1 depicts the IBCS 10 of the present invention providing a wireless means for communicating with and charging a wireless appliance, e.g., an electronic device, such as can be found at home or a business. Such wireless devices that may benefit from wireless charging system include, but are not limited to personal computer, lap-top computers, printer, digital TV, set-top box, home appliances, etc.

As shown in FIG. 1, the IBCS of the invention includes a HomePlug® adaptor 10 for plug-in to a power outlet, which adaptor that is equipped with an antenna used to transmit and receive RF signals to and from a wireless device 20 for wireless communication therewith. According to one implementation, the wireless signals communicated from the adaptor 12 are at a first frequency or within a first frequency range, or communicate in accordance with an industry power line communications standard, such as the HomePlug® specification (e.g., HomePlug® 1.0) one of at least two versions of the specification for home networking technology that connects devices to each other through the power lines in a home. HomePlug® certified products connect PCs and other devices that use Ethernet, USB, and 802.11. Many devices have HomePlug® built in and to connect them to other home devices via a home network, e.g., Ethernet. As will be explained in greater detail herein, the adaptor 10 operates within a wireless environment, to provide at least one signal source for transmitting and receiving signals to and from the electronic devices such as data, video, audio, etc., signals, and at least one power transmitting source to ensure the electronic device is fully charged all the time.

Figure 2:
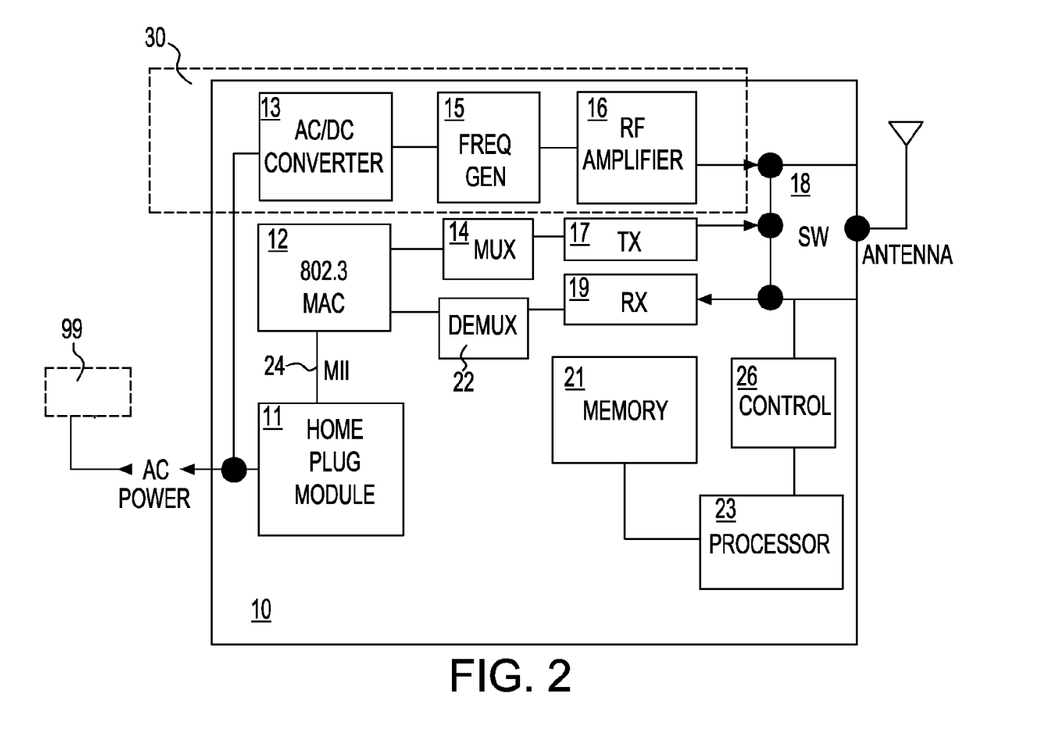
FIG. 2 is a block diagram depicting a HomePlug® adaptor 10 including a wireless power charging unit 30.

In one embodiment, the adaptor 10 also includes a wireless power charging unit designed to transmit RF signals at a second frequency or within a second frequency range that are used to remotely charge the wireless device 20 in a manner that can be controlled, e.g., executable via a frequency generator within the HomePlug® adaptor unit 10 of FIG. 2. The remote wireless device must be placed within a certain distance range so that charging efficiency can be maintained. In one example, the distance range in which the RF signals may be communicated from the HomePlug® adaptor 10 to the wireless device is in the range of 3 to 20 feet, but may be increased, as technology advances. Further, in this example embodiment, two or more, e.g., three, wireless device antennas are configured for receiving at the wireless device, this is because in one embodiment, data transmitting, receiving and power charging are performed simultaneously. It is conceivable that less number of antennas can be allowed, since, in other embodiments, data transmitting and battery charging may be performed at different periods of time. Although, a HomePlug® Power system is illustrated, it is understandable that the same intelligent battery charging method can apply to other wireless configurations, such as those employing a base station and end-point wireless devices. In either embodiment, when the wireless device 20 does not stay inside the power charging range, and the battery is below a predetermined low limit, audible warning signals may be generated by the system and will be triggered to warn a user.

Referring to FIG. 2 is a block diagram of the invention regarding to an adaptor 10 including a wireless power charging unit 30 that is integrated or housed within the existing HomePlug® adaptor 10. The power charging unit comprises an AC-to-DC converter 13, a frequency generator 15 and a RF amplifier 16. Other signal processing necessary to render the power transmission signals, e.g., filters, modulators, as necessary, may be included. The converter 13 converts AC current into DC current that is used to generate a suitable frequency that is then amplified by a RF amplifier 16 and transmitted via the antenna device. An antenna switch 18 is offered to allow sharing antenna between power and signal transmission. A control unit 26 receives control signals from a processor 23 to select antenna switch and control other signal/antenna switching activities in the HomePlug® adaptor. A power line source is connected directly to an AC/DC converter 13 and a HomePlug® module 11, in a manner as described in greater detail in connection with FIG. 3.

A conventional HomePlug® adaptor 10 without power charging unit is currently available. However, it does not have an integrated wireless power charging unit 30. By plugging the adaptor in a wall power outlet, e.g., supplying 110/220 volts, single or 3 phase (not shown), the adaptor, in one mode of operation, can receive power line signals from the power line wall outlet, for example, and convert them into a RF signal which can then transmitted to a wireless device via the shared antenna according to a communications protocol. Likewise, in another mode of operation, the adaptor antenna is able to receive the RF signals transmitted by the wireless device 20, de-modulate and/or process them and forward the information, data or command signals to a home network 99 via the AC power line. On the other hand, signals from HomePlug® module 11 received from network via AC power line are coupled to a 802.3 Media Access Controller (MAC) unit 12. These signals are serialized via a multiplexer device (MUX) 14 and transmitted out to the remote device via a transmitter 17 and the antenna. In one embodiment, communications over the home network are governed according to HomePlug® networking technology specification that enables wireless devices to communicate with network through the power lines in a home or business. The HomePlug® certified products connect computing devices, e.g., laptops, mobiles, PCs and other devices that use Ethernet, USB, and 802.11 through the power line network. Such HomePlug® devices typically function as a transparent Ethernet bridge, and many computers can use these devices for network access. There are several versions of HomePlug® standard that the present invention may operate in accordance with including: HomePlug® 1.0 (standard for governing speeds of up to 14 Mbit/s half-duplex, for example), Turbo (standard for speeds, e.g., of up to 85 Mbps), and AV versions (standard designed for governing transmission of signals at HDTV and VoIP speeds of up to 200 Mbps). It is understood that other home networking technology standards may govern.

In one aspect, the invention is configurable for adaptation with new developing standards such as described in the I.E.E.E. P1901 Draft Standard for Broadband over Power Line Networks: Medium Access Control and Physical Layer Specifications. This emerging standard governs modulation techniques for high-speed communications (e.g., greater than 100 Mbps at the physical layer) over the alternating current electric power lines, i.e., for so called Broadband over Power Line (BPL) devices. The proposed IEEE standard will use transmission frequencies below 100 MHz and will be usable by all classes of BPL devices, including BPL devices used for the first-mile/last-mile connection (<1500 m to the premise) to broadband services as well as BPL devices used in buildings for LANs and other data distribution (<100 m between devices). This standard focuses on the balanced and efficient use of the power line communications channel by all classes of BPL devices, defining detailed mechanisms for coexistence and interoperability between different BPL devices, and ensuring that desired bandwidth and quality of service may be delivered. This standard is limited to the physical layer and the medium access sub-layer of the data link layer, as defined by the International Organization for Standardization (ISO) Open Systems Interconnection (OSI) Basic Reference Model.

Referring back to FIG. 2, in a transmit mode of operation, the HomePlug® adaptor may transmit data signals from the MAC interface via selection through a multiplexer MUX unit 14, or a serializer device that converts parallel data into serial data and is subsequently sent out via a coupled RF transmitter TX device 17 when enabled via programmed switch device 18. Similarly, in the receiver mode of operation, the signals transmitted by a wireless device are received by a RF receiver RX device 19, and are subsequently processed through a Demux (demultiplexor) 22, or a Deserializer, that converts the serial data into parallel data. These data are then coupled to the 802.3 MAC device. The output data signal 24 from the MAC is in Media Independent Interface (or called MII) format, or like communications format, and is coupled to the HomePlug® Module 11 for communication over the power line/network 99. A memory unit 21, comprising either volatile or non-volatile memory storage, or both, are used to store instructions, critical data, and key parameters used for the remote wireless charging and communication operations. The memory unit 21 is coupled to a processor 23, controller or a digital signal processor used to control antenna switch, and control traffic of data flow between the adaptor and the wireless device, as will be explained in further detail herein below.

Figure 3:
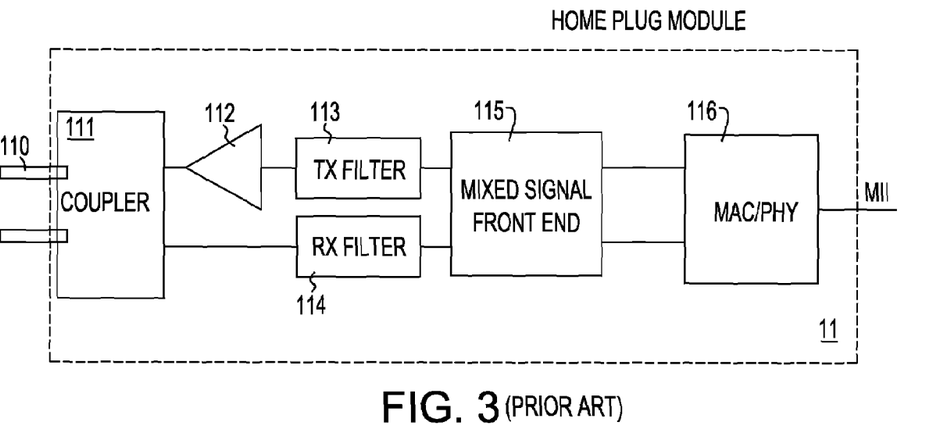
FIG. 3 is the block diagram of the Homeplug® module 11 of the adaptor 10 of FIG. 2.

Referring to FIG. 3 there is depicted a detailed block diagram of the Homeplug module 11 described in the adaptor 10 of FIG. 2 as providing as interface with the power line/home network. Homeplug® module 11 comprises a coupler 111 that connects to the wall AC outlet 110 and has a transmitter 112, a TX filter device 113, a RX filter device 114, a mixed signal front end device 115 and a MAC/PHY layer unit 116. The coupler 111 couples signals to/from the AC power line. The transmitter transmits analog signal via TX filter device 113 into the coupler via a driver 112, while the receiver filter 114 receives signals from AC power line via the coupler. The mixed signal front-end converts received analog signals into digital signals and vice versa, i.e., converts received digital signals into analog signals. The converted digital signals are sent to MAC/PHY block 116 and converted to MII format.

Figure 4:
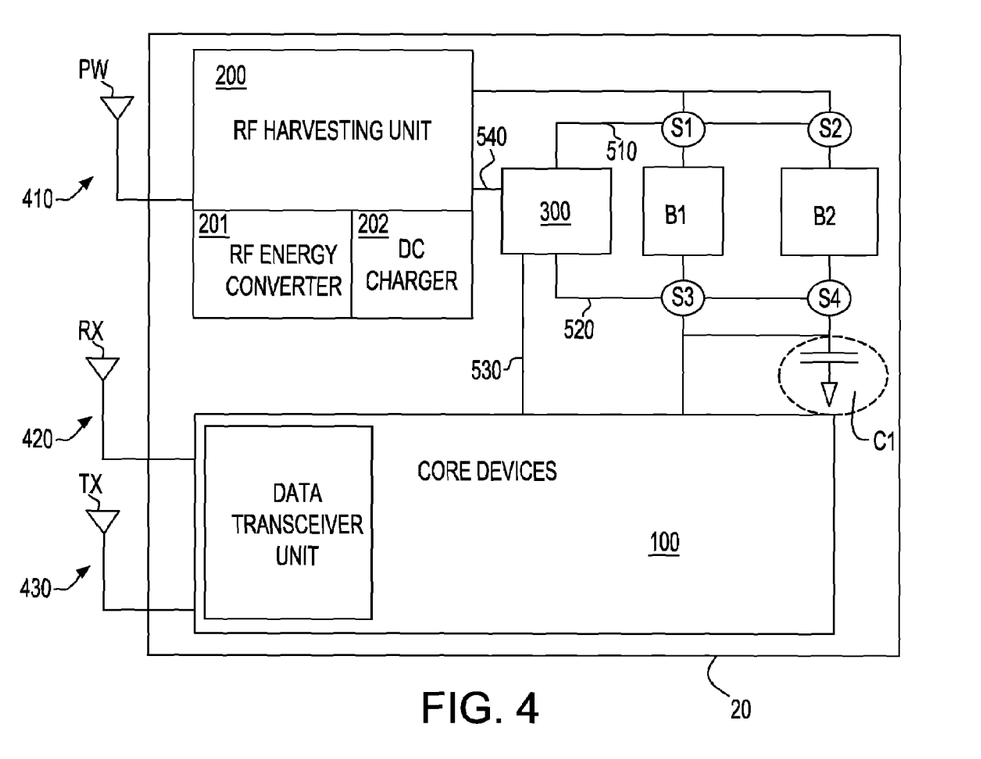
FIG. 4 depicts a wireless device 20 having a wireless battery charging unit operable for being wireless remotely charged according to the present invention.

Referring to FIG. 4, there is depicted a wireless device 20 having a wireless battery charging unit that may be mounted to, coupled to or embedded within the wireless device 20 according to the present invention. The wireless battery charging unit comprises a first antenna dedicated to a power harvesting unit 200. The power harvesting unit 200 further comprises a RF energy converter unit 201, and a DC charger unit 202. The power harvesting unit 200 receives RF signals transmitted from power transmitter of the HomePlug® wireless adaptor 10 via its power transmission antenna. The DC charger 202 converts RF signals into a DC current and will be used to charge one or more batteries or other power storage devices, depending upon the power requirements of the wireless device. In one embodiment, the wireless device includes two batteries, however the invention is not so limited. Batteries may include, but is not limited to: chargeable/re-chargeable batteries, fuel cell, capacitors, charge storage, electrolytic, chemical energy storage, flow cell, voltaic, radioactive, or other energy storage devices. In one embodiment, the first battery B1 may function as a primary battery for use in normal wireless device operation; and the second battery B2 may function as a back-up battery and can be charged any time. The back-up battery can be used to swap the primary battery when the power level of the primary battery drops below a pre-set or controlled lower limit. In the example embodiment depicted in FIG. 4, four (4) switch devices may be used to coordinate the switching. For example, when B1 is fully charged and during active mode, B1 is connected to core device's supply line, therefore switch S3 is short and switch S1 is open. In the mean time, B2 is booked up for charging, at this moment switch S2 is short and switch S4 is open. To avoid power noise during battery swapping, a capacitor C1 is provided to stabilize the supply line. Block 300 is the control block which has a built-in state-machine or co-processor, or a DSP unit to control the switch. An algorithm comprising for controlling charging operations according to a programmed state machine will be discussed in greater detail herein below. The control block 300 sends control signals to switches S1-S4, core 100 as well as RF harvesting unit 200. This is because the request for wireless charging (or request to stop wireless charging) signal is preferably be sent out via TX antenna 430 to the HomePlug® adaptor 10 which can control the adaptor to initiate transmitting or cease transmitting the RF signals. The duplex core devices 100 can receive signals while sending the request independently. The wireless core design is well known in the art and thus will not be further explained. Details of the RF harvest to generate DC current in a wireless mode are also known in the art such as shown and described in U.S. Pat. Nos. 7,068,991 and 6,664,770, as non-limiting examples.

Figure 5:
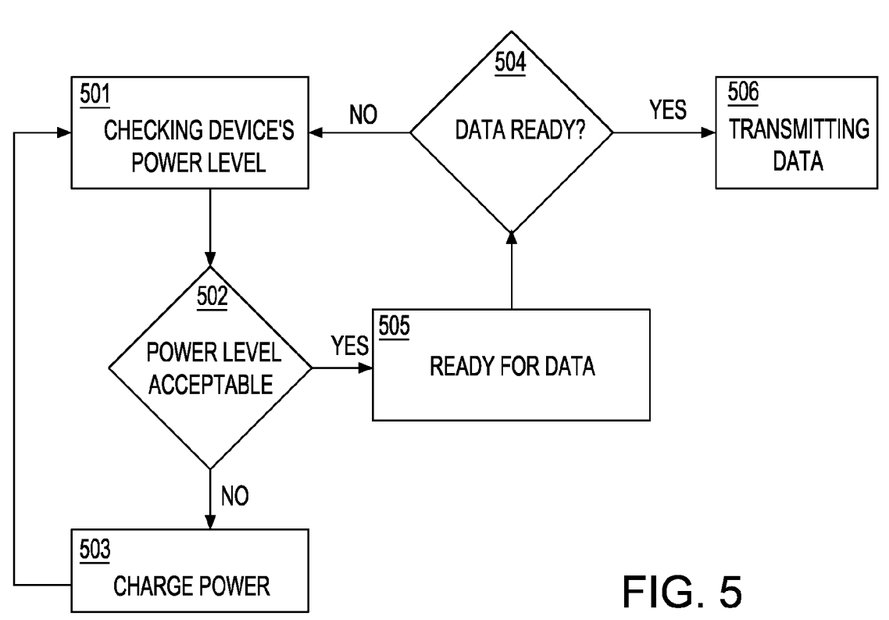
FIG. 5 depicts an example algorithm for controlling power charging according to a method of a first embodiment.

FIG. 5 depicts an example algorithm for controlling power charging operations according to a first embodiment example. In this embodiment, a single battery is included and thus requires only one corresponding HomePlug® adaptor. The HomePlug® adaptor 10 can periodically check battery level of a wireless unit 501, and determines whether the level is acceptable 502. In other words, the IBCS, by transmitting suitable inquiry signals from the adaptor and receiving response signals from the wireless device, the IBCS implements intelligent power management and can determine whether the battery level is below a predetermined low limit. For instance, if the power charge level is determined by the wireless device processor as not acceptable, or below a lower limit threshold, request signals may be generated and transmitted for receipt at the adaptor to the initiate charging operations, and, in response, via the HomePlug® adaptor, the charger will start wirelessly charging the battery 503 and when the battery is fully charged it returns to monitor device charge level at 501. Otherwise, if it is determined that the power level is acceptable at 502, the IBCS system is ready 504 for transmitting and/or receiving wireless data communications 505. If no data is available for data communications, the system it goes back to monitor the power level. Otherwise, it starts data communication 506.

It is understood that, according to the invention, the wireless charge signals generated by the IBCS system can be tailored to the particular wireless device. That is, the wireless charging may be performed in a controlled manner, such as operably programmed by instructions executed by the system processor. For example, the wireless charge signals can be tailored to storage device characteristics, e.g., performing a charging hysteresis as needed by certain types of batteries or power storage devices, and/or control the charge/discharge cycle depth.

In accordance with this and each of the other embodiments of the invention as described herein, a communication or handshaking mechanism is employed between the wireless networked device and the adaptor device to check charge range as well as power level. In one example, this is accomplished by utilizing predetermined codes. For example, the wireless device 20 may send out a query after determining a need for intelligent power charging and wait for a pre-determined period of time. If no signal is received from the adaptor, this is an indication that the device cannot be charged, e.g., due to it being out of wireless data communication range. Thus, the device will initiate generation of a warning signal to the user, e.g., audible sound or message, the warning indicating to a user that the charging distance between the devices must be shortened. When the adaptor receives a signal from the device, it will respond with a specific code to the device that can be recognized by the device to mean the charging distance is acceptable.

Once the charging distance is acceptable, the adaptor, under programmed processor control, periodically queries the wireless device on power level, i.e., the devices will send another pre-determined code via wireless data communication signals that the adaptor device recognizes to indicate the wireless device's power is low and should start wireless charging within a predetermined period of time. As mentioned, the wireless device 20 has a power management design, especially for the dual battery system, to handle the battery swapping and charging.

Figure 6:
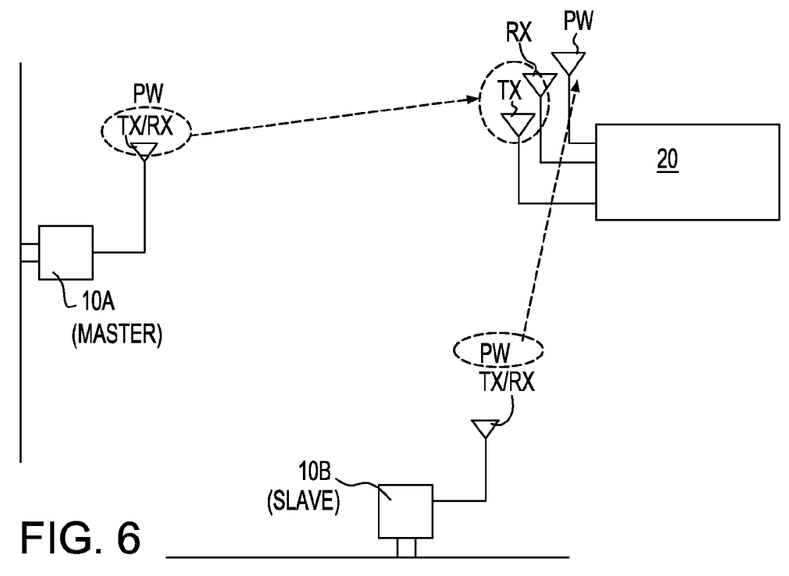
FIG. 6 depicts a block diagram depicting a wireless remote battery charging system implementing two HomePlug® power adaptors 10A and 10B with a first HomePlug® power adaptor served as a master adaptor 10A for data communication with the wireless device and a second adaptor 10B adapted mainly for power transmission.

In a second embodiment, the invention is designed for use with wireless devices which are demanded for semi-active data communication. In this example, two HomePlug® adaptors 10A and 10B are implemented as shown in FIG. 6. A first HomePlug® is served as the master adaptor 10A used mainly for data communication. The second adaptor 10B is called the slave adaptor is mainly used for power transmission. Therefore the wireless device 20 should be located within a certain range of two adaptors such that it can receive simultaneous transmissions. This "dual plug" (master and slave plug) system provides low-noise to the wireless device, as the power charging signals and data signals are from different adaptors.

Figure 7A:
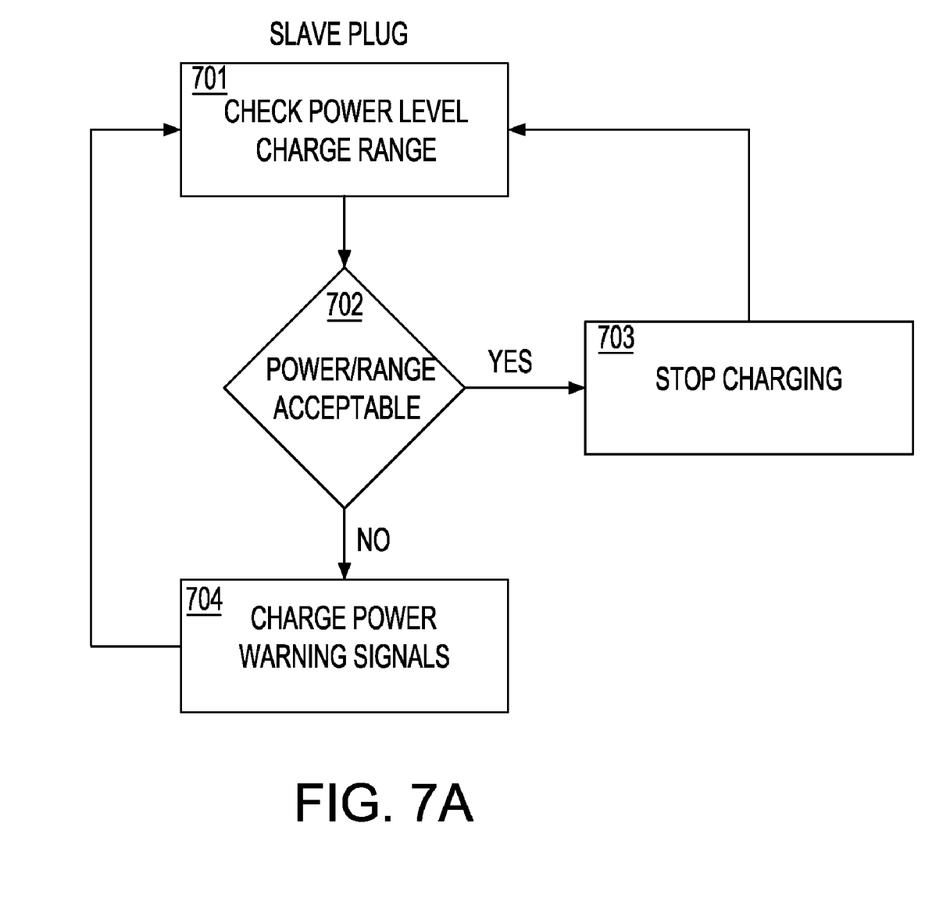
FIGS. 7A and 7B depict two flow chart diagrams implementing respective state-machine control of two home adaptors operating according to a second embodiment of the invention; and, FIG. 8 depicts a third embodiment of the invention wherein two adaptors are employed and two batteries are installed in the wireless device.
Figure 7B:
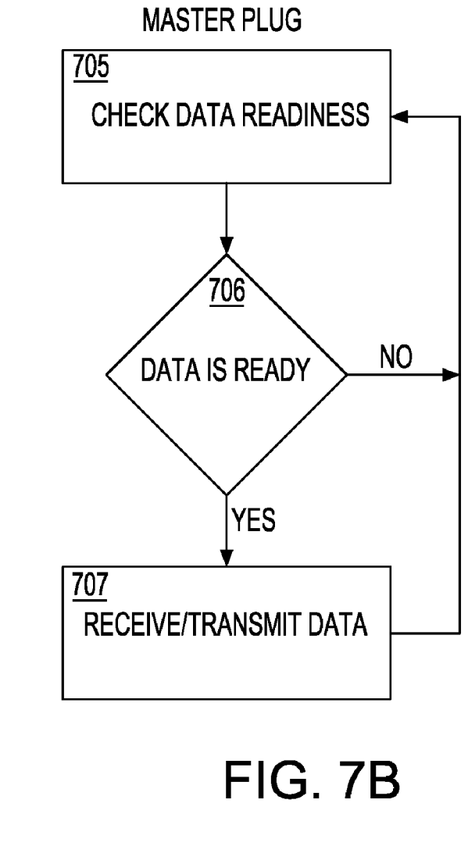

FIGS. 7A and 7B depict two flow chart diagrams implementing respective state-machine control of two home adaptors operating according to a second embodiment of the invention. To keep power charging more effectively, the wireless device must first be placed within a certain range towards power adaptor. One way to check this distance is to initiate communication between device and the power adaptor. If wireless device can not receive a return signal from the adaptor, it will trigger a warning signal which indicates that devices is out of charging range. Another example, slave plug 10B, FIG. 7A continually, periodically or on-demand checks the power charging range as well as the power level of the battery 701 of the wireless device. If it is determined that the wireless device is located outside the charge range for wireless charging 702 according to the invention, a warning signal will be triggered 704. If the battery level is lower than predetermined level, it will start charging, and the wireless device can commence its normal operation. When the battery level reaches a predetermined high level or set upper limit, the charging operation will stop 703. The process then returns to check the power level and the charge range 701.

It is understood that, according to each of the embodiments of the invention, the wireless charge signals generated by the IBCS system can be tailored to the particular wireless device. That is, the wireless charging may be performed in a controlled manner, such as operably programmed by instructions executed by the system processor. For example, the wireless charge signals can be tailored to storage device characteristics, e.g., performing a charging hysteresis as needed by certain types of batteries or power storage devices, and/or control the charge/discharge cycle depth. Such wireless charge signals can further be used to ensure that some types of rechargeable batteries are fully discharged before recharging, for example.

In the embodiment of the invention depicted in FIG. 7B, the Master home plug 10A is responsible for performing data transmission communications only and will first check whether the data is ready for transmit or receive operations 705. If HomePlug® 10A is ready for such operations 706, it performs normal wireless signal communication 707 according to well-known wireless data communication protocols. Therefore, the user must set one plug adaptor as the master and the other as the slave. The purpose is to transmit data and power simultaneously without affecting each other.

Figure 8:
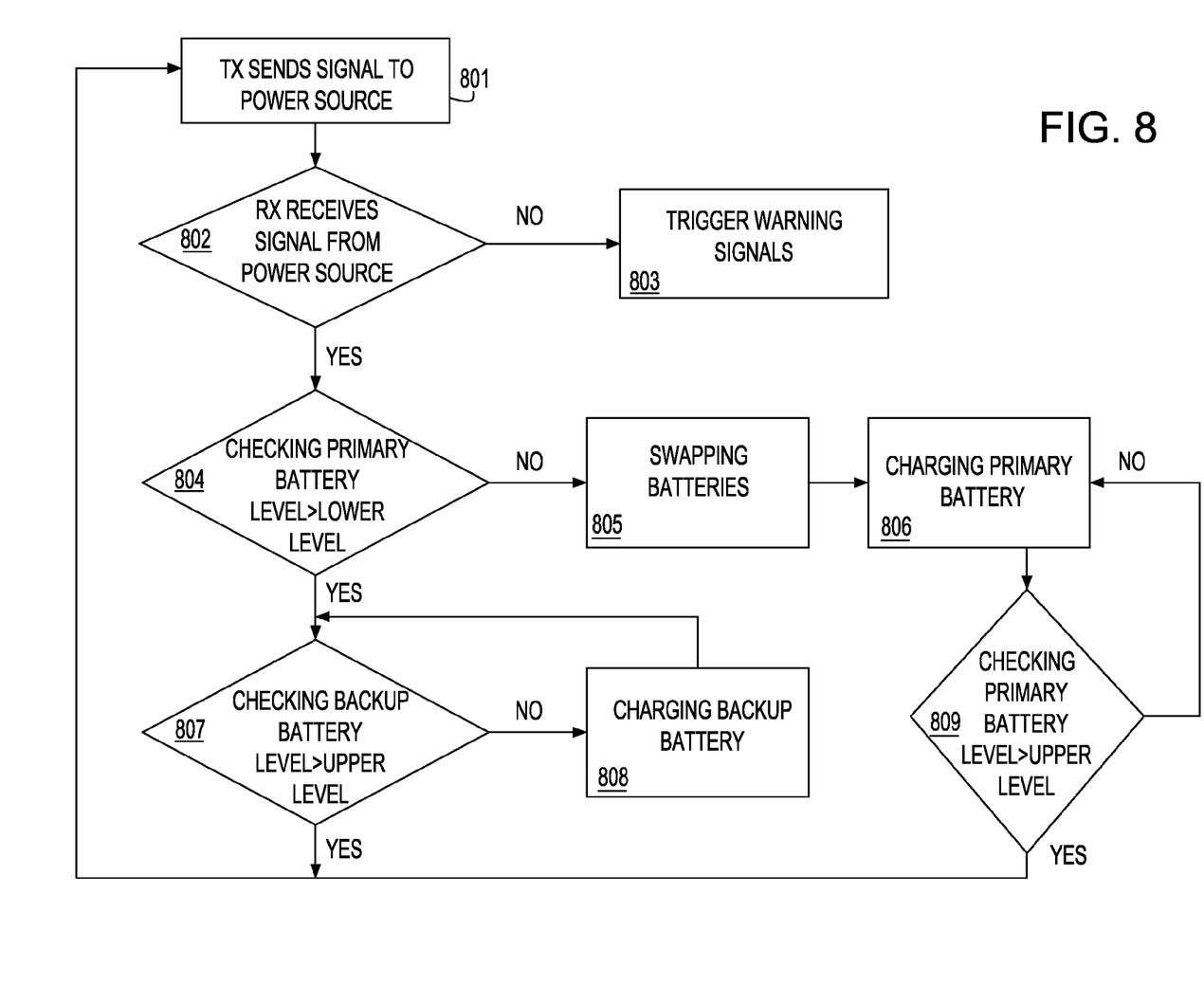

A third embodiment of the invention is depicted in FIG. 8 wherein two adaptors are employed and two batteries are installed in the wireless device 20. This configuration may be advantageously employed for highly active wireless devices. The data traffic is very busy and there is almost no standby mode for battery charging. The algorithm starts out by checking the effective power charge range. The wireless device sends a signal to the home adaptor plug and waits for a response 801. If the received signal is poor or not acceptable, 802 a visual or audible warning signal will be triggered 803 to warn the users. If the signal strength is acceptable the intelligent will start checking the primary battery level and determine whether it is higher than the lower level of an acceptable charge range. If the charge level is higher than a set lower level, then battery swapping is taking place 805, and immediately the primary battery is subjected to a charging operation 806. It will continue to charge the primary battery until its level exceeds a high limit 809. However, if the primary battery strength is greater than the predetermined low limit, it will check the backup battery level to determine whether it is higher than a predetermined high limit 807. If the answer is negative, then it starts charging the backup battery 808.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An intelligent power management system for wirelessly networked devices including one or more chargeable energy storage devices for powering said networked device, said system comprising:

an adaptor device, adapted for coupling to an AC source, said adaptor device further comprising a power charge unit receiving said AC source and generating and transmitting RF power signals via a first transmitter for charging said chargeable energy storage devices of said wirelessly networked device;

said adaptor further having a second transmitter device for transmitting wireless data communication signals from said AC source to said wirelessly networked device, and a receiver device for receiving wireless data communication signals from said wirelessly networked device to said AC source; and, a switchable antenna device switched to receive wireless data communication signals from or transmit wireless data communication signals to said wirelessly networked device in a first operation mode, and switched to transmit said RF power signals for powering a wirelessly networked device in a second operation mode, wherein said wirelessly networked device comprises:
a power harvesting unit including an RF energy converter for receiving said transmitted RF power signals and converting said RF power signals into a charge current suitable for charging said wirelessly networked device;
a switch device coupled to said one or more chargeable energy storage devices for switching in or out said charging current according to device power level status; and,
a control unit for monitoring a device power level status indicating a state of charge of said one or more energy storage devices, said control unit operatively coupled to said switch device for enabling switching in a charge current for charging said energy storage device when a device power level status is determined below an acceptable limit,
wherein, said system provides wireless device power charging to maintain an energy storage device at a proper charge level.

2. The intelligent power management system for wirelessly networked devices as claimed in claim 1, wherein said AC source provides said AC power and signals.

3. The intelligent power management system for wirelessly networked devices as claimed in claim 2, wherein said adaptor device further comprises:
a network interface device for enabling data communications between said adaptor unit and a communications network over an AC power line; said wirelessly networked device adapted for communication with said communications network via said adaptor.

4. The intelligent power management system for wirelessly networked devices as claimed in claim 2, wherein said one or more energy storage devices includes a primary battery for powering said wirelessly networked device, said switching device further controllable for switching out powering of wirelessly networking device from said primary battery and initiate charging operations for said primary battery when said primary battery is determined to have a device power level status below an acceptable limit.

5. The intelligent power management system for wirelessly networked devices as claimed in claim 2, wherein wireless charge signals generated for charging said wirelessly networked device are tailored to characteristics of said one or more energy storage devices, said wireless charge signals being controlled to perform a charging hysteresis or tailor charge/discharge cycles depth as needed by an energy storage device.

6. The intelligent power management system for wirelessly networked devices as claimed in claim 1, wherein said power charge unit of said adaptor device comprises:
a signal converter means for generating a dc signal commensurate with said received AC power signals;
a frequency generator device receiving said generated dc signal and selecting a RF power signal frequency according to said generated dc signal; and,
RF power amplifier for generating said transmitted RF power signals for powering a wirelessly networked device at said selected RF power signal frequency.

7. The intelligent power management system for wirelessly networked devices as claimed in claim 1, wherein said wirelessly networked device receives simultaneously both said RF power signals and said wireless data communication signals.

8. The intelligent power management system for wirelessly networked devices as claimed in claim 7, wherein said adaptor device further comprises:
processing means for converting received wireless data signals from said receiver device into data signals suitable for transmission over said AC power line to said communications network; and,
converting data signals received from said communications network into data signals suitable for wireless transmission to said wirelessly networked device.

9. The intelligent power management system for wirelessly networked devices as claimed in claim 8, wherein said one or more energy storage devices further includes a back-up battery, said switching device further controllable for switching out powering of wirelessly networking device from said primary battery and seamless switching in said back-up battery for powering wirelessly networked device operation.

10. The intelligent power management system for wirelessly networked devices as claimed in claim 8, wherein said control unit further determines a charge state of said back-up battery, said switching device further controllable for enabling a charging operation for said back-up battery when said back-up battery is determined to have a device power level status below an acceptable limit.

11. The intelligent power management system for wirelessly networked devices as claimed in claim 8, wherein said adaptor device queries, via wireless data communication, an energy storage level of said one or more energy storage devices of said wirelessly networked device, said system enabling generation of signals for receipt at said wireless device adaptor from said wirelessly networked device for indicating power level status, said adaptor either initiating said storage device charging operations or not, in response.

12. The intelligent power management system for wirelessly networked devices as claimed in claim 8, wherein said wirelessly networked device is adapted to determine whether it is in distance range or out of range of said adaptor device for receiving said RF power signals, and when out of range, generates an out of range indication for a user.

13. The intelligent power management system for wirelessly networked devices as claimed in claim 12, wherein said adaptor device is a first adaptor device utilized for handling said wireless data communication between said communications network and said wirelessly networked device, said system further comprising:
a second adaptor device, connectable on a power receptacle means for receiving AC power signals, said second adaptor further comprising: a power charge unit receiving said AC power signals and generating and transmitting said RF power signals suitable for powering said wirelessly networked device when said wirelessly networked device indicates a power level status below a set limit.

14. The intelligent power management system for wirelessly networked devices as claimed in claim 12, wherein said wirelessly networked device comprises a first antenna device for receiving said wireless data communication signals communicated from said first antenna device, and a second antenna device for receiving said RF power signals from said second adaptor device, wherein said wirelessly networked device receives simultaneously both said RF power signals and said wireless data communication signals, said RF power signals being transmitted to said wirelessly networked device via said antenna device at a respective different RF frequency.

15. An adaptor device, for coupling to an AC power receptacle providing AC power signals, for use in an intelligent power management system for wirelessly networked devices, said adaptor device comprising:

a power charge unit receiving said AC power signals and generating and transmitting RF power signals for powering a wirelessly networked device, said power charge unit comprising:

a signal converter means for generating a dc signal commensurate with said received AC power signals;

a frequency generator device receiving said generated dc signal and selecting a RF power signal frequency according to said generated dc signal; and, RF power amplifier for generating said transmitted RF power signals for powering a wirelessly networked device at said selected RF power signal frequency;

a transmitter device for transmitting wireless data communication signals to said wirelessly networked device, and a receiver device for receiving wireless data communication signals from said wirelessly networked device; and, a single antenna device adapted to receive wireless data communication signals from or send wireless signals to said wirelessly networked device and simultaneously, transmit said RF power signals for powering a wirelessly networked device, wherein said wireless data communication signals and said RF power signals are transmitted to said wirelessly networked device via said antenna device at a respective different RF frequency.

16. The method of remote intelligent charging as claimed in claim 15, wherein said RF power signals generating comprises:

converting said received AC power signals into a dc signal;
selecting, based on said dc signal, a RF power signal frequency; and,
amplifying signals at said RF power signal frequency for powering a wirelessly networked device at said selected RF power signal frequency.

17. The method of remote intelligent charging as claimed in claim 15, wherein said monitoring comprises:

implementing, at said wirelessly networked device, a control device for determining whether it is in distance range or out of range of said adaptor device for receiving said RF power signals, and when out of range, generating an out of range indication for a user.

18. The method of remote intelligent charging as claimed in claim 17, wherein said communicating a current determined power level to said adaptor device is in response to a query issued by said adaptor device via wireless transmission to said wirelessly networked device.

19. The method of remote intelligent charging as claimed in claim 15, wherein said monitoring comprises:

implementing, at said wirelessly networked device, a control device for determining a power level of said chargeable energy storage devices;

communicating a current determined power level to said adaptor device via wireless data signal transmission; and, generating, at said adaptor device, said RF power signals for receipt at said wireless device adaptor, when said control device determines a device power level below an acceptable limit.

20. The method of remote intelligent charging as claimed in claim 15, wherein said adaptor device is a first adaptor device utilized for handling said wireless data communication between said communications network and said wirelessly networked device, said method further comprising:

providing a second adaptor device, mountable on a second power receptacle means for receiving AC power signals, said second adaptor comprising a power charge unit receiving said AC power signals and generating and transmitting said RF power signals suitable for powering said wirelessly networked device when said wirelessly networked device indicates a power level status below a set limit.

21. The method of remote intelligent charging as claimed in claim 15, further comprising:

receiving, at a first antenna device at said wireless device, said wireless data communication signals communicated from said first adaptor device, and simultaneously receiving, at a second antenna device at said wireless device, said RF power signals from said second adaptor device, for charging simultaneously performing charging operations, said wireless data communication signals and said RF power signals being transmitted to said wirelessly networked device at a respective different RF frequency.

22. A method of remote intelligent charging of wirelessly networked devices, said device having one or more chargeable energy storage devices for powering said networked device, said method comprising:

receiving, at an adaptor device coupled to an AC power receptacle, AC power signals, said adaptor device having a transmitter device for transmitting wireless data communication signals to said wirelessly networked device, and a receiver device for receiving wireless data communication signals from said wirelessly networked device;

generating, at said adaptor device, RF power signals from said received AC power signals for wireless transmission to a wirelessly networked device; and, transmitting, via an RF transmitter at said adaptor device, said RF power signals for powering a wirelessly networked device, wherein said adaptor device includes a single antenna device adapted to receive wireless data communication signals from or send wireless signals to said wirelessly networked device in a first operation mode, and in a second operation mode, to transmit said RF power signals for powering a wirelessly networked device;

receiving, at said wirelessly networked device, said transmitted RF power signals; and, converting said received RF power signals into charge current suitable for charging said wirelessly networked device;

monitoring a device power level status indicating a state of charge of said one or more energy storage devices; and, switching a charging current in or out, via a switch device coupled to said one or more chargeable energy storage devices, to charge an energy storage device according to a determined device power level status; wherein said switching device enables switching in a charge current for charging said energy storage device when a device power level status is determined below an acceptable limit.

23. The method of remote intelligent charging as claimed in claim 22, further comprising: tailoring wireless charge signals generated for charging said wirelessly networked device to characteristics of said one or more energy storage devices, said wireless charge signals being controlled to perform a charging hysteresis or tailor charge/discharge cycles depth as needed by an energy storage device.

24. An intelligent power management system for wirelessly networked devices including one or more chargeable energy storage devices for powering said networked device, said system comprising:
- a first adaptor device, for coupling to an AC power receptacle, having a transmitter device for transmitting wireless data communication signals to a wirelessly networked device, and a receiver device for receiving wireless data communication signals from said wirelessly networked device, said first adaptor device providing an interface for communicating data signals to a network via AC power lines;
- a second adaptor device, for coupling to an to an AC power receptacle providing AC power signals, and adapted for wireless data communication with said wirelessly networked device, said second adaptor device further comprising a power charge unit receiving said AC power signals and generating and transmitting RF power signals for powering a wirelessly networked device;
- said first adaptor device including a single antenna device adapted to receive wireless data communication signals from or send wireless signals to said wirelessly networked device, and, said second adaptor device including a single antenna device adapted to transmit said RF power signals for powering said wirelessly networked device, said wirelessly networked device receiving simultaneously both said wireless data communication signals from said first adaptor device and RF power signals from said second adaptor device;
- a power harvesting unit, provided at said wirelessly networked device, including RF energy converter unit for receiving said transmitted RF power signals and converting said RF power signals into a charge current suitable for charging said wirelessly networked device;
- a switch device, at said wirelessly networked device, coupled to said one or more chargeable energy storage devices for switching in or out said charging current according to device power level status; and,
- a control unit for monitoring a device power level status indicating a state of charge of said one or more energy storage devices, said control unit operatively coupled to said switch device for enabling switching in a charge current for charging said energy storage device when a device power level status is determined below an acceptable limit,
- wherein, said system provides for wireless device power charging to maintain continuously an energy storage device at a proper charge level.

25. An intelligent power management system for wirelessly networked devices including one or more chargeable energy storage devices for powering said networked device, said system comprising:
- a first adaptor device, for coupling to an AC power receptacle, having a transmitter device for transmitting wireless data communication signals to a wirelessly networked device, and a receiver device for receiving wireless data communication signals from said wirelessly networked device, said first adaptor device providing an interface for communicating data signals to a network via AC power lines;
- a second adaptor device, for coupling to an to an AC power receptacle providing AC power signals, and adapted for wireless data communication with said wirelessly networked device, said second adaptor device further comprising a power charge unit receiving said AC power signals and generating and transmitting RF power signals for powering a wirelessly networked device;
- said first adaptor device including a single antenna device adapted to receive wireless data communication signals from or send wireless signals to said wirelessly networked device, and, said second adaptor device including a single antenna device adapted to transmit said RF power signals for powering said wirelessly networked device, said wirelessly networked device receiving simultaneously both said wireless data communication signals from said first adaptor device and RF power signals from said second adaptor device;
- a power harvesting unit, provided at said wirelessly networked device, including RF energy converter unit for receiving said transmitted RF power signals and converting said RF power signals into a charge current suitable for charging said wirelessly networked device;
- a switch device, at said wirelessly networked device, coupled to said one or more chargeable energy storage devices for switching in or out said charging current according to device power level status; and,
- a control unit for monitoring a device power level status indicating a state of charge of said one or more energy storage devices, said control unit operatively coupled to said switch device for enabling switching in a charge current for charging said energy storage device when a device power level status is determined below an acceptable limit,
- said one or more energy storage devices includes a primary battery for powering said wirelessly networked device, and, further includes a back-up battery, said switching device controllable for switching out powering of wirelessly networking device from said primary battery and initiate charging operations for said primary battery when said primary battery is determined to have a device power level status below an acceptable limit, and, seamless switching in said back-up battery for powering wirelessly networked device operations, wherein, said system provides wireless device power charging to maintain an energy storage device at a proper charge level.

* * * * *